United States Patent [19]
Niwata et al.

[11] Patent Number: 6,047,341
[45] Date of Patent: Apr. 4, 2000

[54] DISK-CARTRIDGE-TYPE ADAPTER INCLUDING SENSOR AND PROCESSOR SUPPLYING POWER FROM POWER SOURCE TO DRIVE INTERFACE UPON DETECTING ROTATION OF MAGNET ACCORDING TO SENSOR OUTPUT

[75] Inventors: Tsuyoshi Niwata; Shigeru Hashimoto, both of Kawasaki, Japan

[73] Assignee: Fujitsu Limited, Kawasaki, Japan

[21] Appl. No.: 09/057,457

[22] Filed: Apr. 9, 1998

[51] Int. Cl.[7] .............................. G06F 13/10; G06F 13/20
[52] U.S. Cl. ................. 710/62; 710/63; 710/13; 710/8
[58] Field of Search .................. 710/1, 62, 63, 710/13, 8

[56] References Cited

U.S. PATENT DOCUMENTS

| | | | |
|---|---|---|---|
| 5,159,182 | 10/1992 | Eisele | 235/492 |
| 5,338,923 | 8/1994 | Grieu | 235/492 |
| 5,457,590 | 10/1995 | Barrett et al. | 360/133 |
| 5,471,038 | 11/1995 | Eisele et al. | 235/380 |
| 5,584,043 | 12/1996 | Burkart | 395/882 |
| 5,663,533 | 9/1997 | Aucsmith | 235/492 |

FOREIGN PATENT DOCUMENTS

| | | |
|---|---|---|
| WO 95 22096 | 8/1995 | WIPO . |
| WO 98 11497 | 3/1998 | WIPO . |

*Primary Examiner*—Thomas C. Lee
*Assistant Examiner*—Rehana Perveen
*Attorney, Agent, or Firm*—Armstrong, Westerman, Hattori, McLeland & Naughton

[57] ABSTRACT

A disk-cartridge-type adapter is capable of reducing power consumption.

The adapter has a sensor for detecting the rotation its of a motor of a drive into which the adapter is inserted. If the sensor detects that a magnet (101) attached to a spindle of the motor is not running, power from a power source of the adapter is supplied only to an MPU of the adapter and is not supplied to an interface with the drive.

4 Claims, 14 Drawing Sheets

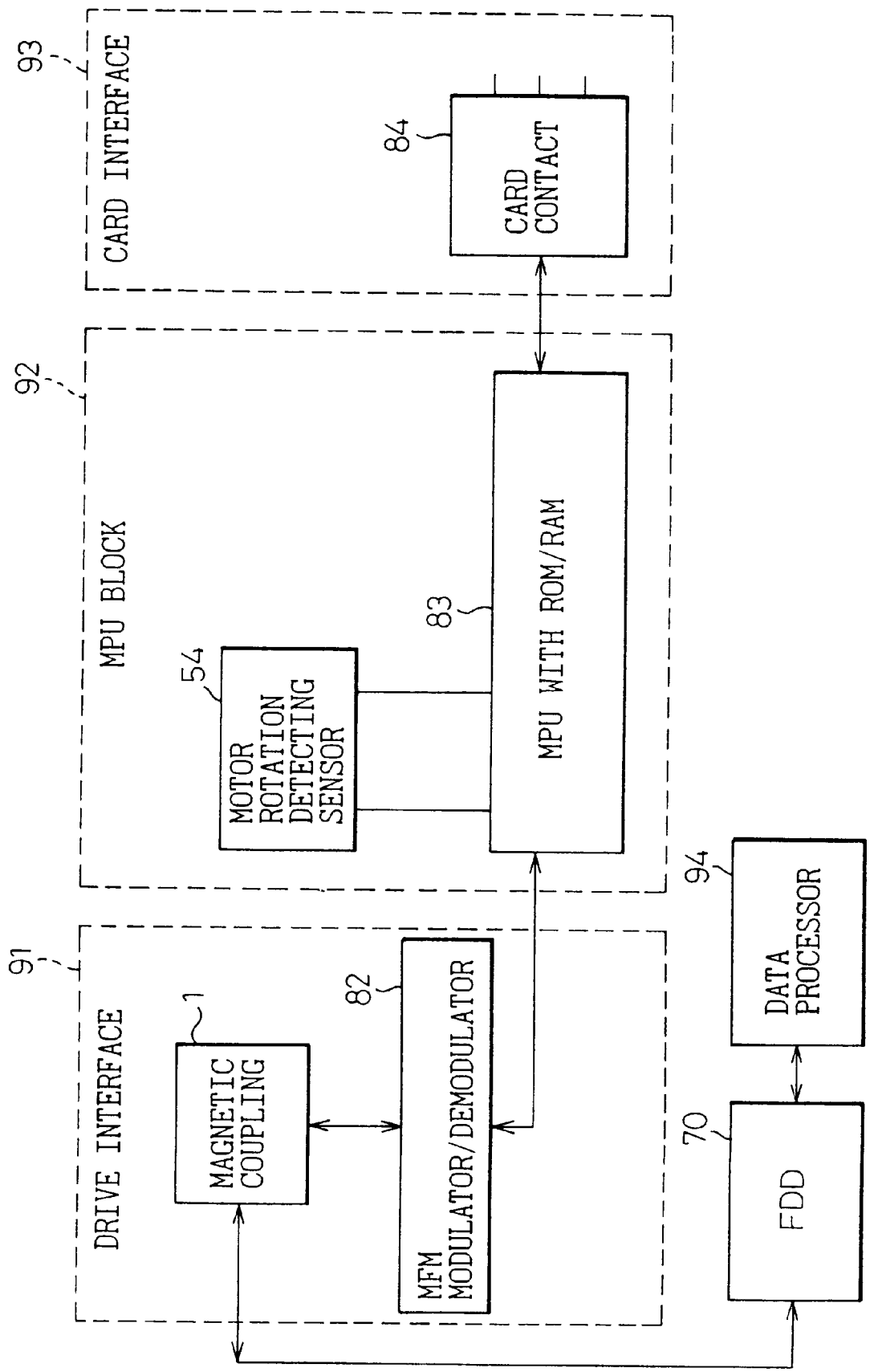

DISK-CARTRIDGE-TYPE ADAPTER INCLUDING SENSOR AND PROCESSOR SUPPLYING POWER FROM POWER SOURCE TO DRIVE INTERFACE UPON DETECTING ROTATION OF MAGNET ACCORDING TO SENSOR OUTPUT

BACKGROUND OF THE INVENTION

1. Field of the Invention

The present invention relates to an adapter and, particularly, to a disk-cartridge-type adapter having the same shape as a disk cartridge such as a 3.5-inch FPD (floppy disk) cartridge. The adapter accommodates an IC card or a semiconductor memory that stores various kinds of information such as electronic money information. The adapter is inserted into a disk cartridge drive such as a 3.5-inch FDD (floppy disk drive).

2. Description of the Related Art

Disk-cartridge-type adapters are disclosed in, for example, a Japanese Unexamined Patent Publication (Kohyo) No. 6-509194 corresponding to U.S. Pat. No. 5,584,043, and a Japanese Examined Patent Publication (Kokoku) No. 7-86912 corresponding to U.S. Pat. No. 5,159,182.

FIG. 1 is a block diagram showing one of the adapters disclosed in the publications. The adapter 1a has the same shape as the 3.5-inch FPD cartridge and incorporates a semiconductor memory 2a for storing, for example, electronic money data, a magnetic head 3, an opening 4 for allowing the head 3 to face a magnetic head of an FDD (not shown), and a battery 5a for supplying power to the memory 2a.

The memory 2a employs the same data format as that of FPDs. The adapter 1a is inserted into an FDD so that data is transferred between the memory 2a and a data processing device such as a personal computer through the FDD.

FIG. 2 is a block diagram showing another adapter disclosed in the publications. The adapter 1b has the same shape as the 3.5-inch FPD cartridge and incorporates an IC card 2b for storing, for example, electronic money data, a microprocessor (MPU) 6, a magnetic head 3, an opening 4 for allowing the head 3 to face a magnetic head of an FDD, and a battery (or a generator) 5b for supplying power to the IC card 2b and MPU 6.

The adapter 1b is inserted into an FDD so that data can be transferred between the IC card 2b and a data processing device such as a personal computer through the head 3 and FDD. The MPU 6 converts data from the data processing device into data to be written into the IC card 2b, and data from the IC card 2b into data to be transferred to the data processing device through the head 3 and FDD.

These adapters 1a and 1b have no means to control the power sources 5a and 5b. The user must turn the power source on before using the adapter with an FDD and turn off the same after removing the adapter from the FDD. If the power source is left on, the battery thereof will become exhausted. The adapters have interfaces for establishing communication with a data processing device and an IC card. If the adapters unconditionally supply power to the interfaces while the power source is on, the power source (battery) will quickly be exhausted. The adapter of FIG. 2 employs the generator 5b instead of a battery. The generator 5b needs a large space, and if the generator 5b is made compact, it will generate insufficient power.

An FDD has a motor for rotating an FPD contained in an FPD cartridge inserted into the FDD. The motor is activated when a magnetic head of the FDD accesses the FPD to transfer data between the FDD and the FPD. If a disk-cartridge-type adapter is inserted into the FDD to transfer data between them, the motor of the FDD starts to rotate. Detecting the rotation of the motor may be usable to determine whether or not the adapter is accessed or not, and it will be sufficient to supply power to the necessary parts of the adapter only when the adapter is accessed.

The adapters of the prior arts, however, have no means for detecting the rotation of the motor of the FDD.

FIG. 3 is a block diagram showing a relationship between a conventional disk-cartridge-type adapter and a disk cartridge drive such as the FDD. The adapter 1 has the same shape as the FPD cartridge. The adapter 1 is inserted into and driven by the drive 8. The drive 8 has a motor 9 and a processor 10. The adapter 1 has a processor 11 such as the MPU 6 of FIG. 2. The processor 10 provides the motor 9 with a rotation instruction. In synchronization with the rotation instruction, the processor 10 provides the processor 11 with a signal through a signal line 12a. As a result, the processor 11 detects the rotation of the motor 9.

FIG. 4 is a block diagram showing a relationship between another conventional disk-cartridge-type adapter and a disk cartridge drive. The same parts as those of FIG. 3 are represented with like reference marks. A rotation signal from a motor 9 is directly sent to a processor 11 of the adapter 1 through a signal line 12b.

In any one of the prior arts of FIGS. 3 and 4, the adapter 1 is independent of the drive 8, and therefore, the adapter 1 needs the physical signal line 12a or 12b to detect a rotation of the motor 9. The signal lines 12a and 12b, however, do not allow the adapters to be removed from the drives.

SUMMARY OF THE INVENTION

An object of the present invention is to provide a disk-cartridge-type adapter having a simple arrangement to reduce the consumption of a battery of the adapter by controlling the battery according to the rotating state of a motor of a drive that drives the adapter.

In order to accomplish the object, an aspect of the present invention provides an adapter shaped to be inserted into a slot of a disk cartridge drive that is designed to receive a disk cartridge containing a recording medium. The adapter has a drive interface for establishing communication, through the disk cartridge drive, with a data processing device connected to the disk cartridge drive, a processor for controlling data transfer between the adapter and the data processing device through the drive interface, a power source for supplying power to the drive interface and processor, and a sensor for detecting a change in a magnetic field produced by the rotation of a magnet linked to a motor of the disk cartridge drive when the adapter is in the disk cartridge drive. Upon detecting the rotation of the magnet according to the output of the sensor, the processor supplies power from the power source to the drive interface.

According to another aspect of the present invention, the processor stops the supply of power to the drive interface upon detecting the stoppage of the rotation of the magnet according to the output of the sensor.

According to still another aspect of the present invention, the adapter has an IC card slot for receiving an IC card that stores various kinds of information, and a card interface for establishing communication between the processor and the IC card. When the rotation of the magnet is detected according to the output of the sensor, the processor supplies power from the power source to the drive interface and card interface. Upon detecting the stoppage of the rotation of the magnet, the processor continues to supply power to the card interface and stops the supply of power to the drive interface.

According to still another aspect of the present invention, the adapter has a semiconductor memory for storing various kinds of information, and a memory interface for establishing communication between the processor and the semiconductor memory. When the rotation of the magnet is detected according to the output of the sensor, the processor supplies power to the drive interface and the memory interface. Upon detecting the stoppage of the rotation of the magnet, the processor continues to supply power to the memory interface and stops the supply of power to the drive interface.

In this way, the processor of the adapter of the present invention supplies power to the drive interface while the processor is detecting the rotation of the magnet of the disk cartridge drive according to the output of the sensor. Namely, the supply of power to the drive interface is limited to a period in which the motor of the disk cartridge drive is rotating. This technique reduces the consumption of the power source (battery) of the adapter while the motor is not running.

BRIEF DESCRIPTION OF THE DRAWINGS

FIG. 9 shows an electric arrangement of the structure of FIG. 8;

DESCRIPTION OF THE PREFERRED EMBODIMENTS

In the following explanation, each disk-cartridge-type adapter has the same shape as the 3.5-inch FPD cartridge, and a disk cartridge drive is the FDD that drives the FPD cartridge.

Figure 1:
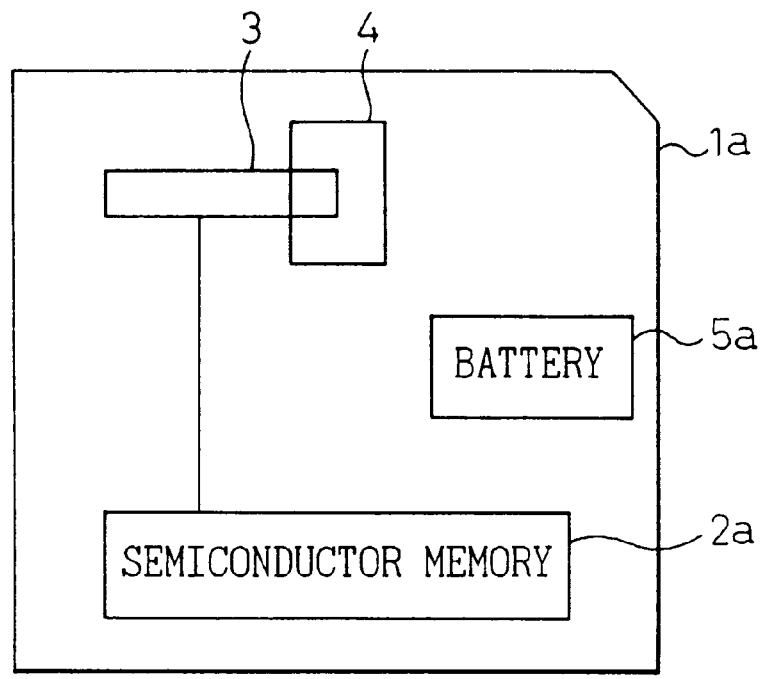
FIG. 1 shows a disk-cartridge-type adapter according to a prior art.
Figure 2:
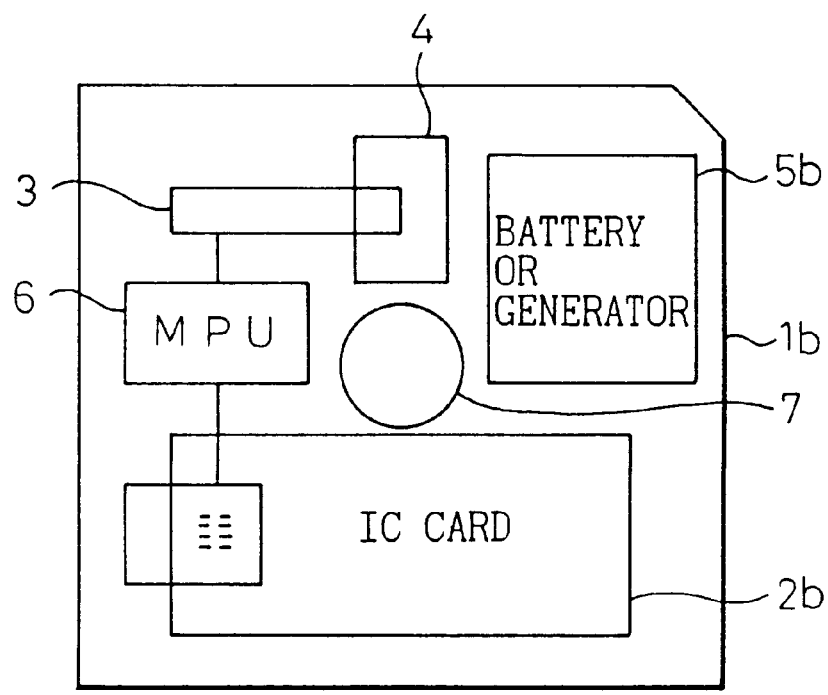
FIG. 2 shows a disk-cartridge-type adapter according to another prior art.
Figure 3:
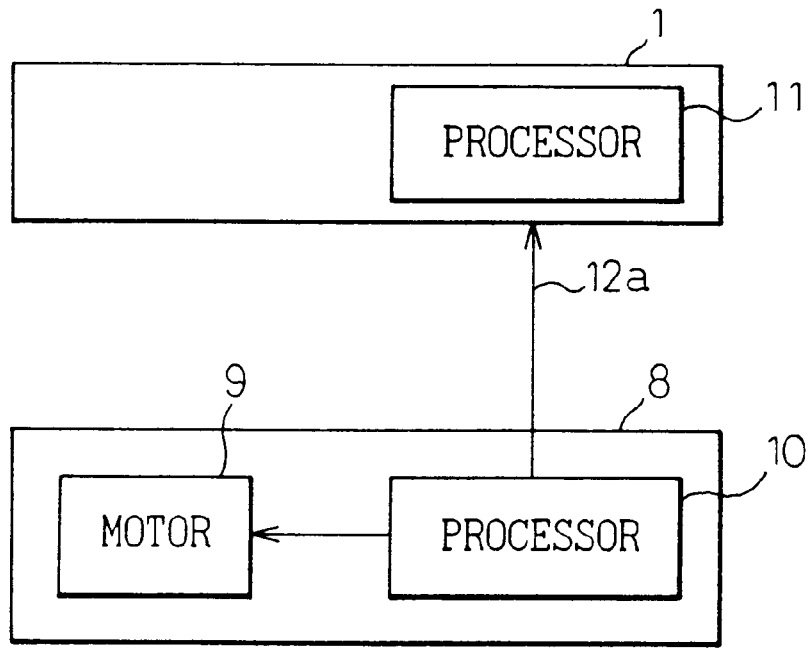
FIG. 3 shows a relationship between a disk-cartridge-type adapter according to still another prior art and a disk cartridge drive.
Figure 4:
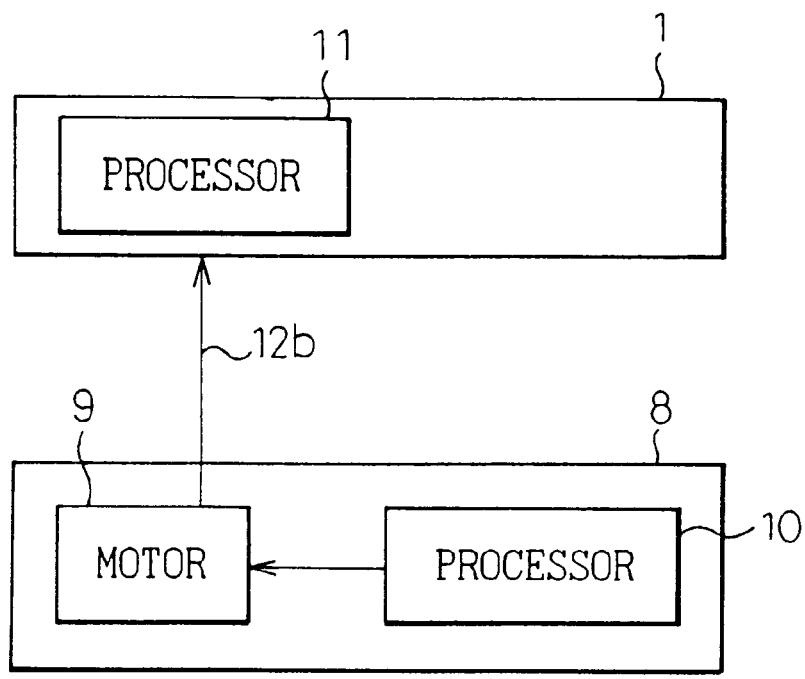
FIG. 4 shows a relationship between a disk-cartridge-type adapter according to still another prior art and a disk cartridge drive.
Figure 5:
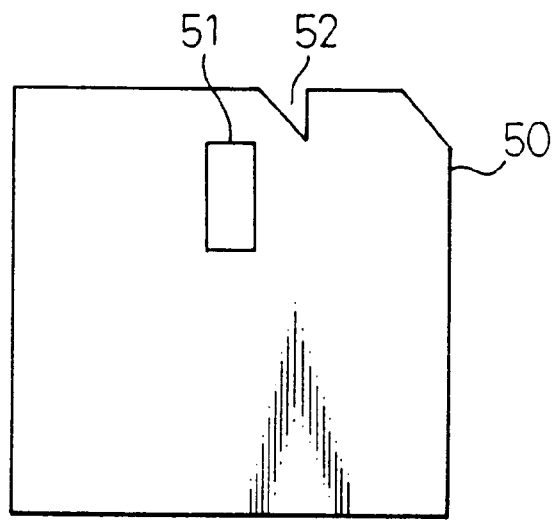
FIG. 5 shows the surface of a disk-cartridge-type adapter according to an embodiment of the present invention having the same shape as the 3.5-inch FPD cartridge.

FIG. 5 shows the surface of a disk-cartridge-type adapter according to an embodiment of the present invention. The shape of the adapter 50 is the same as that of the standard 3.5-inch FPD cartridge. The adapter 50 has a head 51. In case of the FPD cartridge, the head 51 is covered with a shutter when the cartridge is outside an FDD so that no dust enters the head. When the cartridge is inserted into the FDD, the shutter is opened to magnetically connect the FPD with a magnetic head of the FDD. Although the FPD cartridge is always provided with a shutter, the adapter 50 of the present invention need not always be provided with a shutter. The adapter 50 has a cut 52 to receive a shutter opening/closing knob of the FDD. The knob opens the shutter when the adapter 50 is inserted into the FDD. Even if the adapter 50 has no shutter, it must have the cut 51 so that the adapter 50 may have the same shape as the FPD cartridge.

Figure 6:
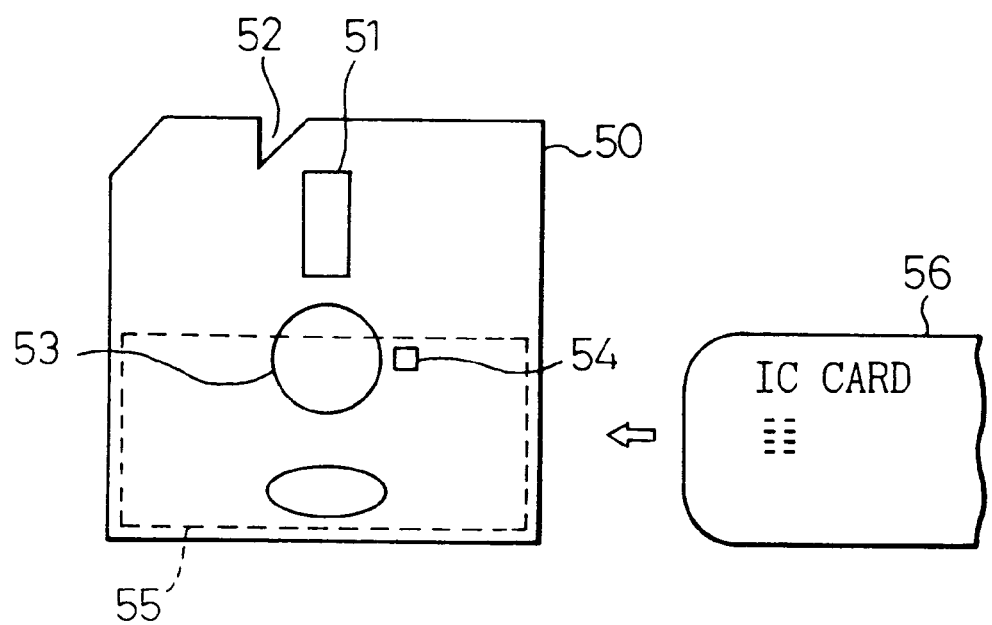
FIG. 6 shows the back of the adapter of FIG. 5.

FIG. 6 shows the back of the adapter 50. The adapter 50 has a circular recess 53. In case of the FPD cartridge, the circular recess receives a circular metal hub, which is attracted by a magnet attached to a spindle of a motor of the FDD. The recess 53 of the adapter 50 may have or not a metal hub. The adapter 50 has a rotation sensor 54 for detecting the rotation of the motor of the FDD, and an IC card slot 55 for receiving an IC card 56.

Figure 7A:
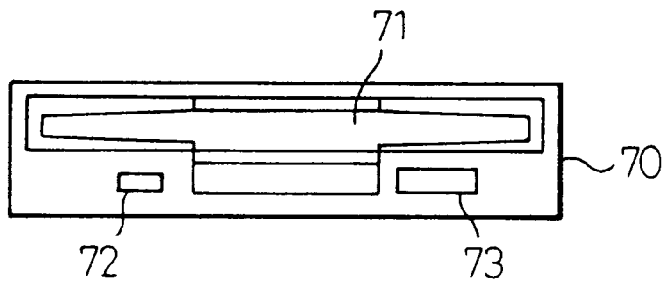
FIGS. 7(a), 7(b), and 7(c) are front, horizontal sectional, and side views showing an FDD into which the adapter of FIGS. 5 and 6 or the FPD cartridge is inserted.
Figure 7B:
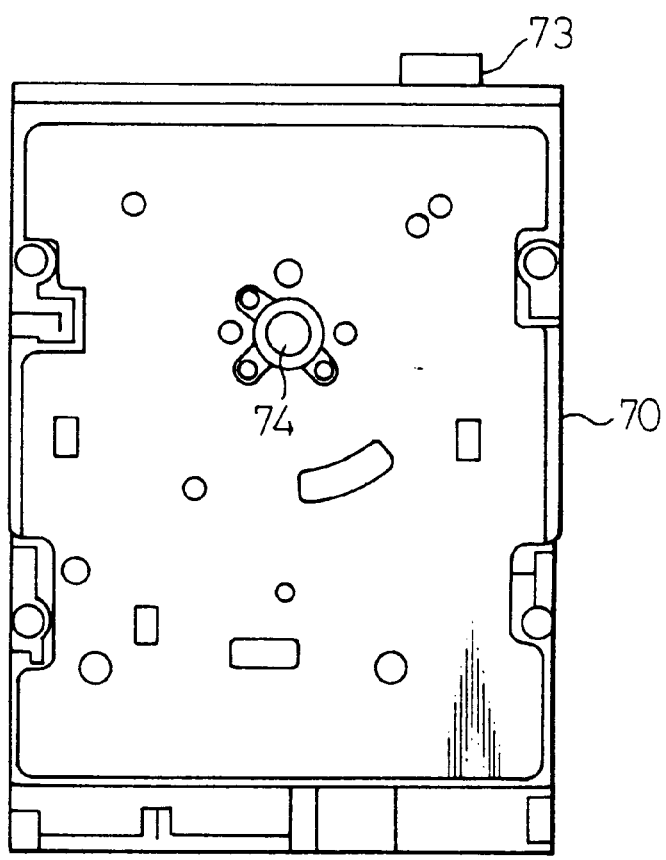
Figure 7C:
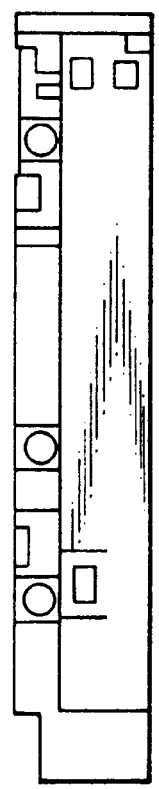

FIG. 7(a) is a front view showing the FDD 70 into which the adapter 50 or FPD cartridge is inserted, FIG. 7(b) is a horizontal cross section showing the FDD 70, and FIG. 7(c) is a side view showing the FDD 70. The FDD 70 has a slot 71 to receive the adapter 50 or FPD cartridge, an LED 72 that lights up when the FDD 70 operates, and an eject button 73 that is pushed to eject the adapter 50 or FPD cartridge from the FDD 70.

The spindle 74 is driven by the motor. The magnet (not shown) is attached to the spindle 74, to attract the metal hub of the FPD. Most of drives including FDDs and optical disk drives for handling cartridge-type recording media have such a magnet. The adapter of the present invention has the sensor 54 for detecting a change in a magnetic field produced by the rotation of the magnet.

Figure 8:
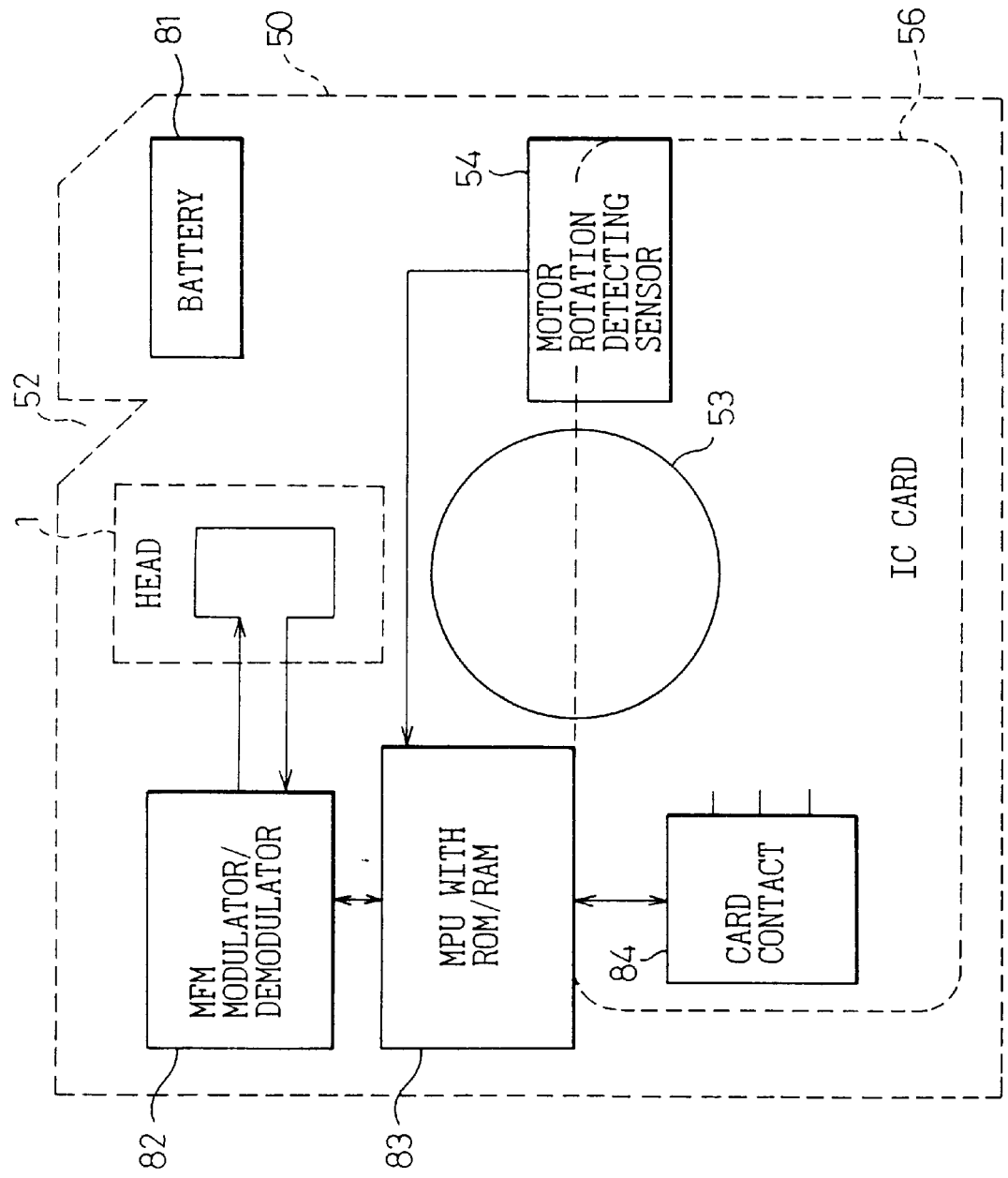
FIG. 8 shows the structure of the adapter of FIGS. 5 and 6.

FIG. 8 shows the details of the adapter 50 of the present invention. The adapter 50 has a battery 81, an MFM (modified FM) modulator/demodulator 82, an MPU 83, and a card contact 84. The MPU 83 has a ROM for storing a program to control data communication between the IC card 56 and the FDD 70, and a RAM for temporarily storing data to be transferred between the IC card 56 and the FDD 70. The card contact 84 is used to write and read data to and from the IC card 56.

FIG. 9 shows an electrical arrangement of the adapter 50. The adapter 50 has a drive interface 91 for handling communication between the adapter 50 and the FDD 70, an MPU block 92, and a card interface 93 for handling communication between the adapter 50 and the IC card 56. The drive interface 91 has the MFM modulator/demodulator 82 and magnetic coupling unit (head) 1. The MPU block 92 has the motor rotation sensor 54 and MPU 83. The card interface 93 has the card contact 84.

The IC card 56 and MPU 83 serially transfer data between them. The MPU 83 and FDD 70 transfer data by magnetic coupling through the MFM modulator/demodulator 82. The FDD 70 communicates with a data processing device 94 such as a personal computer.

After the adapter 50 is inserted into the FDD 70, the adapter 50 must detect an access from the FDD 70. For this purpose, the sensor 54 detects a change in magnetic flux due to the rotation of the magnet of the FDD 70 and informs the MPU 83 of the change with an interrupt. Alternatively, the MPU 83 may detect the output of the sensor 54 and, if it detects a change in the output, determines that there is an access from the FDD 70. If there is no change in the output, the MPU 83 determines that the FDD is stopped. When the FDD is stopped, the MPU 83 stops the supply of power from the battery 81 to the disk interface 91.

Figure 10A:
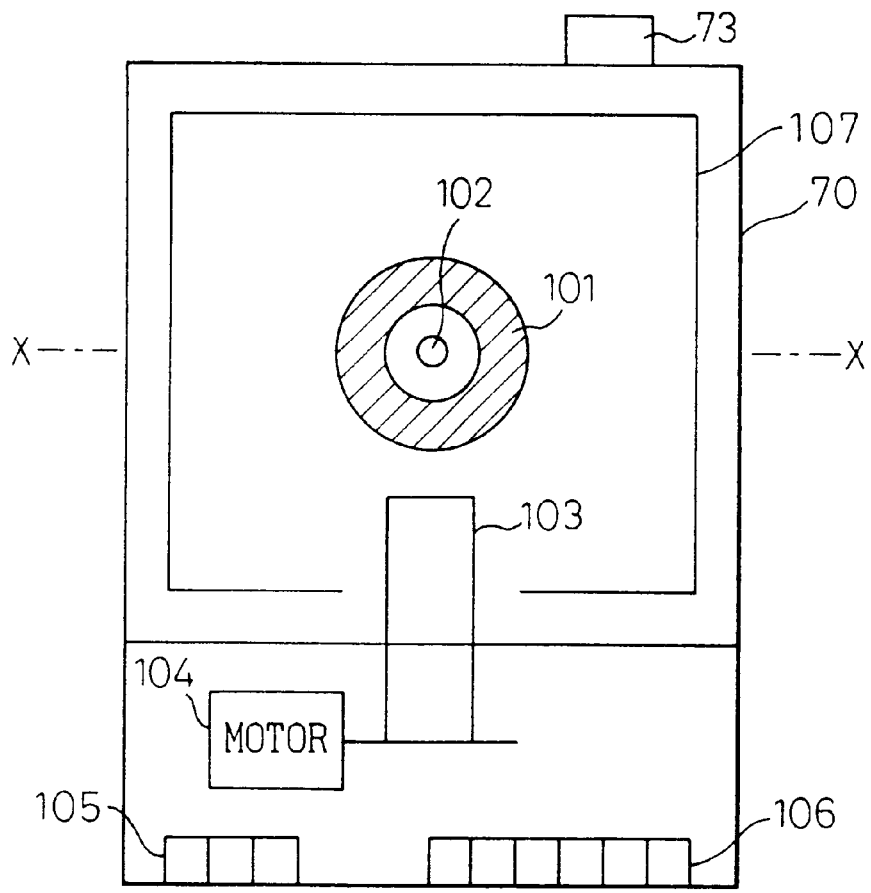
FIG. 10(a) is a plan view showing the internal structure of an FDD applicable to the present invention.
Figure 10B:
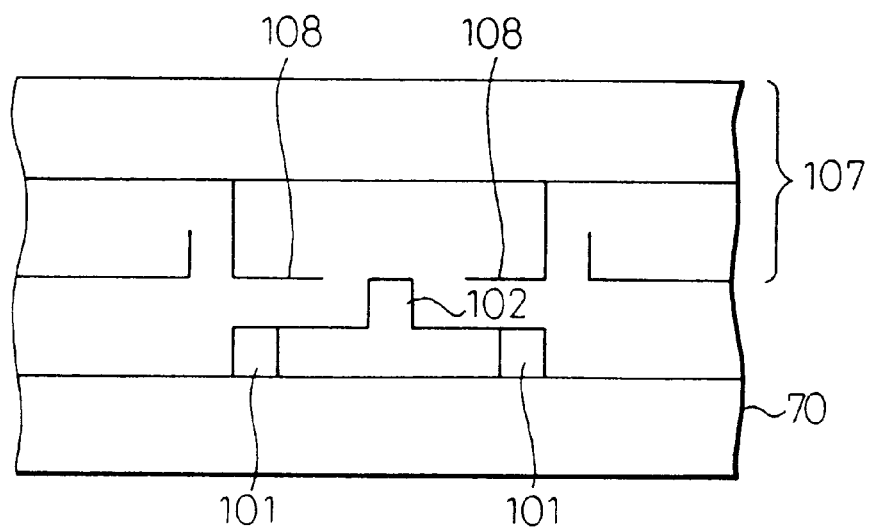
FIG. 10(b) is a sectional view taken along a line X—X of FIG. 10(a)

FIG. 10(*a*) is a plan view showing the inside of the FDD 70. The FDD 70 has an eject button 73 for ejecting an FPD cartridge 107 from the FDD 70, a magnet 101 for attracting and turning the metal hub of an FPD contained in the cartridge 107, a spindle 102 of the motor 104, a magnetic head 103, a power source interface 105, and a signal interface 106.

FIG. 10(*b*) is a sectional view taken along a line X—X of FIG. 10(*a*). In FIG. 10(*b*), the FPD 107 cartridge is not completely set in the FDD 70. The metal hub 108 is separated from the magnet 101. The hub 108 has a center hole to receive the spindle 102. Once the cartridge 107 is completely set in the FDD 70, the magnet 101 attracts the hub 108, to surely turn the FPD.

The present invention utilizes this structure of the FDD 70. The present invention installs the rotation sensor 54 in the vicinity of the circular recess of the adapter 50, to detect a change in magnetic flux due to the rotation of the motor 104 of the FDD 70.

Figure 11A:
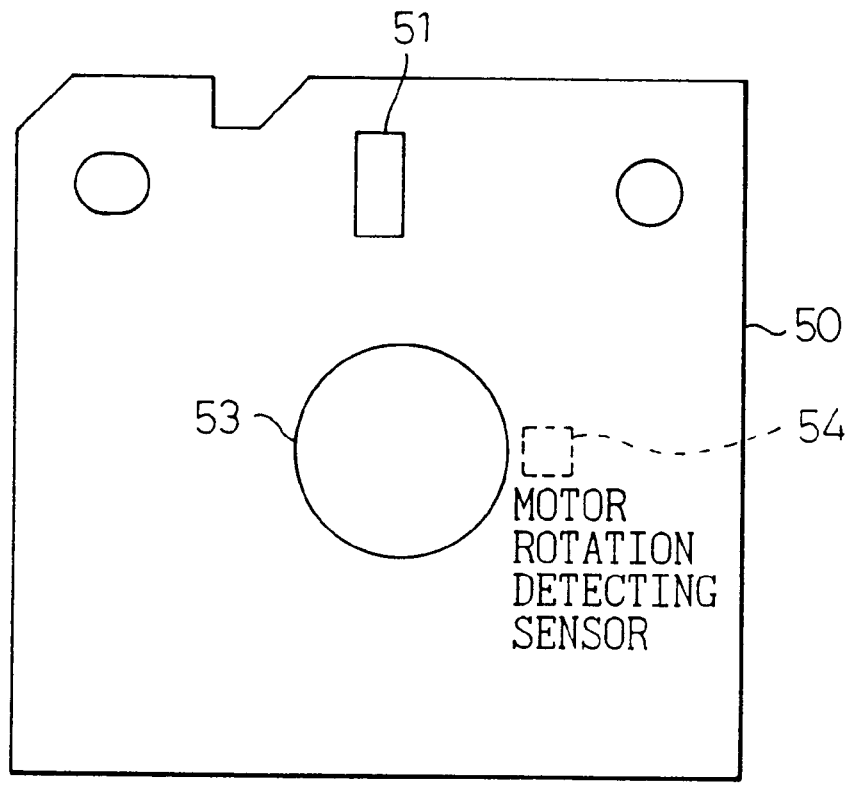
FIG. 11(a) shows the back of the adapter of FIG. 6.
Figure 11B:
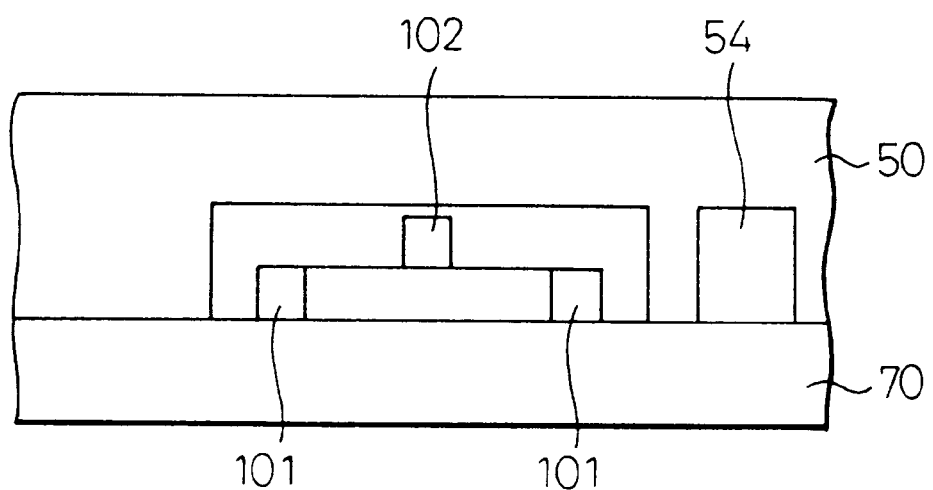
FIG. 11(b) shows the adapter completely inserted in the FDD.

FIG. 11(*a*) shows the back of the adapter 50 of FIG. 6 of the present invention. FIG. 11(*b*) is a sectional view showing the adapter 50 completely set in the FDD 70. Under this condition, the top of the spindle 102 is nearly in contact with the circular recess 53 of the adapter 50. When the magnet 101 turns, the sensor 54 detects it. The output of the sensor 54 is supplied to the MPU 83 (FIG. 9), which determines whether or not the magnet 101 is rotating according to the output of the sensor 54.

Figure 12:
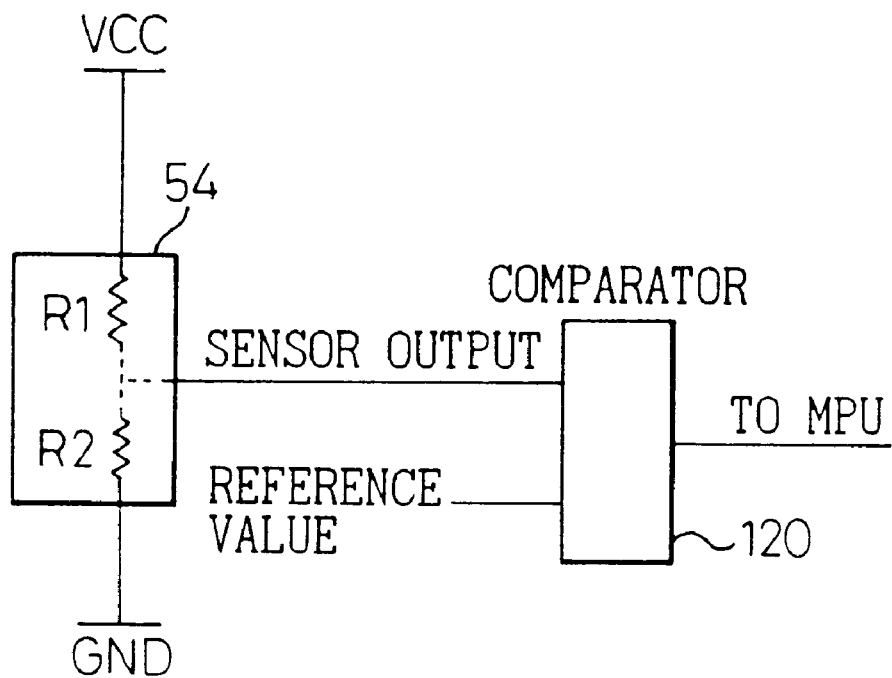
FIG. 12 is a circuit diagram showing a rotation sensor according to an embodiment of the present invention.

FIG. 12 is a circuit diagram showing an example of the sensor 54. The sensor 54 has resistors R1 and R2 whose resistance changes in response to a change in a magnetic field. The resistors R1 and R2 are connected in series between a power source VCC and a ground GND, to form a magnetic resistance (MR) sensor. A node between the resistors R1 and R2 is an output terminal of the sensor 54. A comparator 120 compares the output of the sensor 54 with a reference value and provides "1" if the output of the sensor 54 is above the reference value and "0" if the output is below the reference value. The output of the comparator 120 is transferred to the MPU 83.

Figure 13:
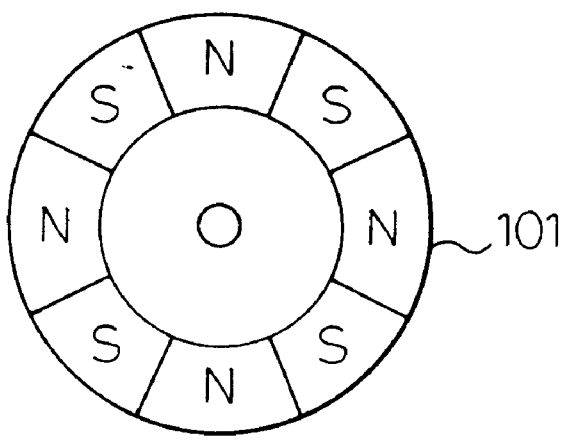
FIG. 13 shows an example of a magnet of the FDD.
Figure 14:
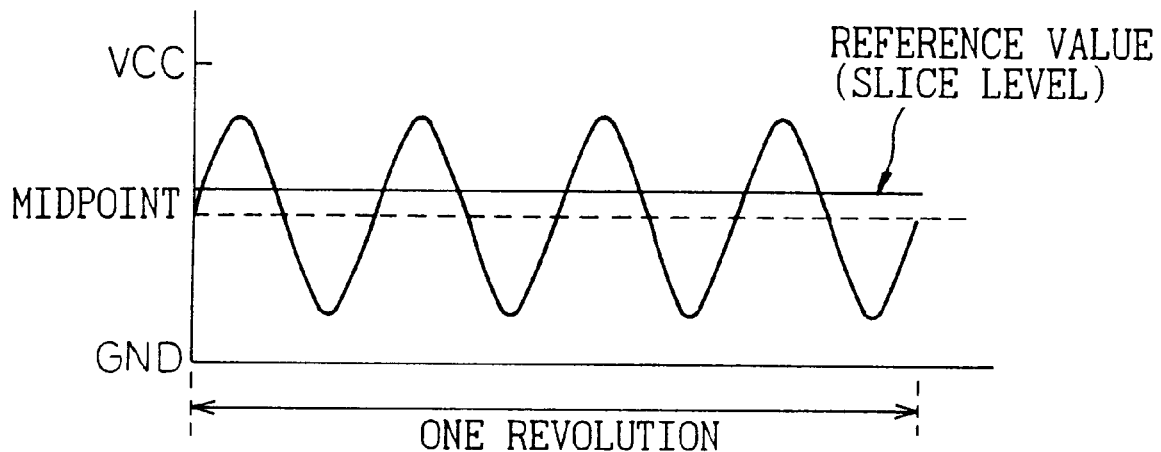
FIG. 14 shows an output waveform of the rotation sensor of FIG. 12 working with the magnet of FIG. 13.
Figure 15:
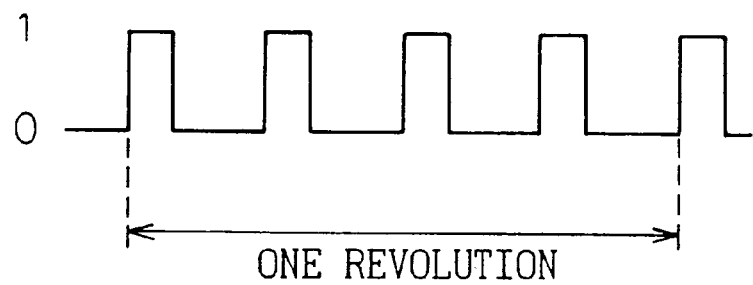
FIG. 15 shows an output waveform of a comparator of the rotation sensor of FIG. 12 working with the magnet of FIG. 13.

FIG. 13 shows an example of the magnet 101 of the FDD 70. The magnet 101 has circumferentially alternating N and S poles. The alternating arrangement of poles reduces noise. In FIG. 13, the magnet 101 has four pairs of N and S poles. Accordingly, the output of the sensor 54 shows four cycles of ON and OFF states when the magnet 101 turns once, as shown in FIG. 14. The comparator 120 compares the output of the sensor 54 with the reference value and provides an output of FIG. 15 having four pulses per rotation of the magnet 101. The MPU 83 detects the pulses, and if the number of pulses per unit time is above a predetermined value, determines that the motor 104 (FIG. 10) is rotating and the FDD 70 is accessing the adapter 50. Then, the MPU 83 supplies power to every element of the adapter 50. If the number of pulses per unit time is below the predetermined value, the MPU 83 determines that the motor 104 is not rotating and the FDD 70 is not accessing the adapter 50. In this case, only the MPU 83 and card interface 93 receive power, and no power is supplied to the other parts of the adapter 50 including the drive interface 91.

The motor 104 needs 200 ms to turn once, in practice. Accordingly, the MPU 83 determines that the motor 104 is running if the number of pulses in 200 ms is greater than, for example, three. If the number of pulses in 200 ms is smaller than three, the MPU 83 determines that the motor 104 is not running.

According to the prior arts mentioned before, the battery 81 must supply power to every element of the adapter 50 once the adapter 50 is inserted into the FDD 70. In this case, the drive interface 91 consumes power even while the FDD 70 is not accessing the adapter 50. On the other hand, the present invention supplies power to the drive interface 91 only while the FDD 70 is accessing the adapter 50, to thereby save power while the FDD 70 is not accessing the adapter 50.

Insertion of the adapter 50 into the FDD 70 is detectable by arranging at least one push switch in the cut 52 (FIG. 5) of the adapter 50. When the adapter 50 is in the FDD 70, the shutter opening/closing knob (not shown) of the FDD 70 pushes the switch. Removing the adapter 50 from the FDD 70 resiliently returns the switch to an OFF position. When the switch is pushed and turned ON to indicate that the adapter 50 has been inserted into the FDD 70, power is supplied from the battery 81 to the MPU block 92.

Figure 16A:
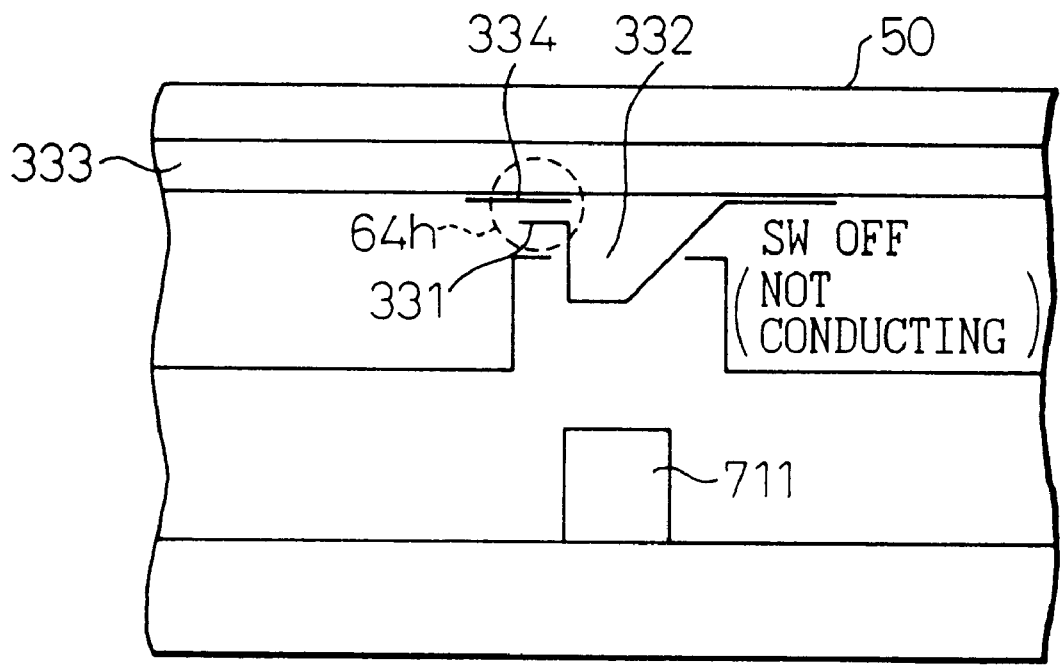
FIGS. 16(a) and 16(b) are partial sectional views showing a disk-cartridge-type adapter before and after insertion into the FDD.
Figure 16B:
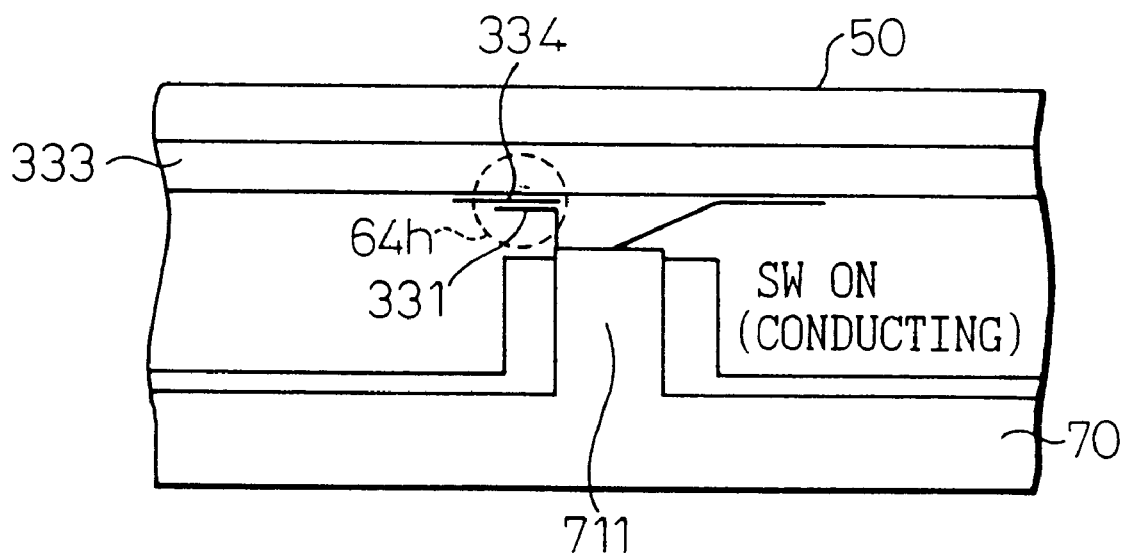

FIGS. 16(*a*) and 16(*b*) show another technique of detecting insertion of the adapter 50 into the FDD 70. This technique uses an FPD write-protect detecting mechanism or FPD double-density detecting mechanism of the FDD 70.

In FIG. 16(*a*), the adapter 50 is not completely set in the FDD 70, and in FIG. 16(*b*), it is completely set in the FDD 70. The adapter 50 has a recess corresponding to the write-protect or double-density detecting mechanism 711 of the FDD 70. The recess has a hole 332 in which a contact 331 of an insertion detecting switch 64 of the adapter 50 is movable. The contact 331 is a resilient part such as a spring. The adapter 50 has a base plate 333 on which the other contact 334 of the switch 64 is arranged.

When the adapter 50 is outside the FDD 70, the contacts 331 and 334 are separated from each other. When the adapter 50 is inserted into the FDD 70, the mechanism 711 of the FDD 70 pushes the contacts 331 and 334 against each other. This results in turning on the switch 64 to supply power from the battery 81 to the MPU block 92.

When the adapter 50 is ejected from the FDD 70, the contacts 331 and 334 are separated from each other due to resilience. As a result, the switch 64 is turned off to stop the supply of power to the MPU block 92.

This arrangement eliminates the need of providing the adapter 50 with a switch to be manipulated by the user to turn on and off the power source of the adapter 50. When the adapter 50 is inserted into the FDD 70, the power source automatically starts to supply power to the MPU block 92 and is automatically shut off when the adapter 50 is removed from the FDD 70, due to the switch 64. This results in improving the operability of the adapter 50 and reducing the power consumption of the same. In addition, power supply to the drive interface 91 is achieved only while the FDD 70 is accessing the adapter 50, to further reduce the consumption of the power source of the adapter 50.

Figure 17:
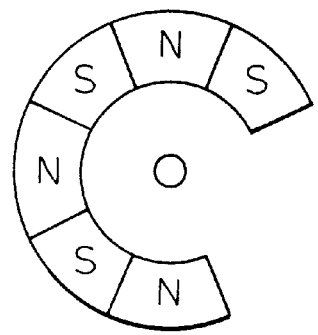
FIG. 17 shows another example of the magnet of the FDD.
Figure 18:
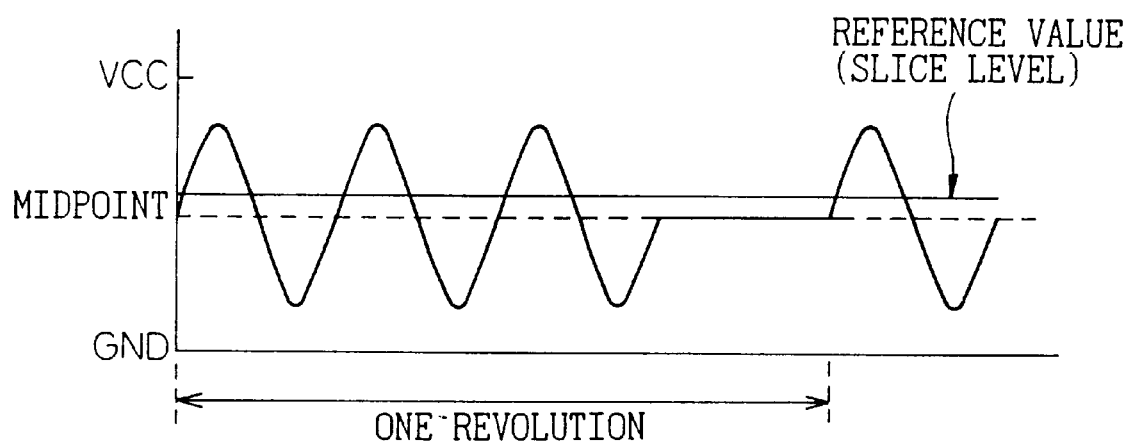
FIG. 18 shows an output waveform of the rotation sensor of FIG. 12 working with the magnet of FIG. 17.
Figure 19:
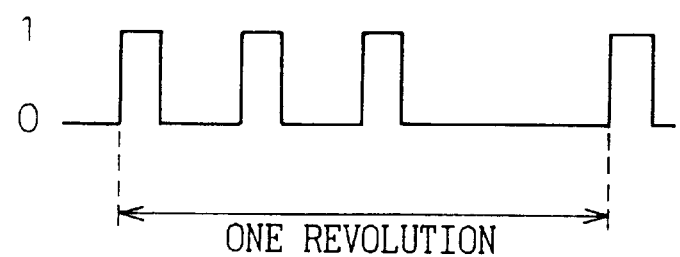
FIG. 19 shows an output waveform of the comparator of FIG. 12 working with the magnet of FIG. 17.

FIG. 17 shows another example of the magnet 101. In this example, the magnet 101 has a C-shape with three pairs of N and S poles. When the magnet 101 turns once, the sensor 54 shows three cycles of ON and OFF states as shown in FIG. 18, and the comparator 120 provides three pulses as shown in FIG. 19.

The MPU 83 determines that the motor 104 is rotating if it detects, for example, at least two pulses, within 200 ms, in the output of the comparator 120 and that the motor 104 is not running if it detects less than two pulses.

Figure 20:
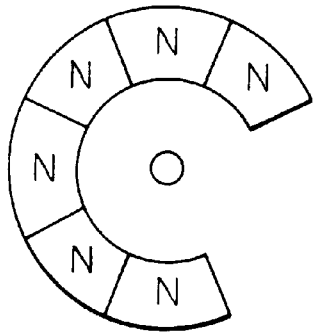
FIG. 20 shows still another example of the magnet of the FDD.
Figure 21:
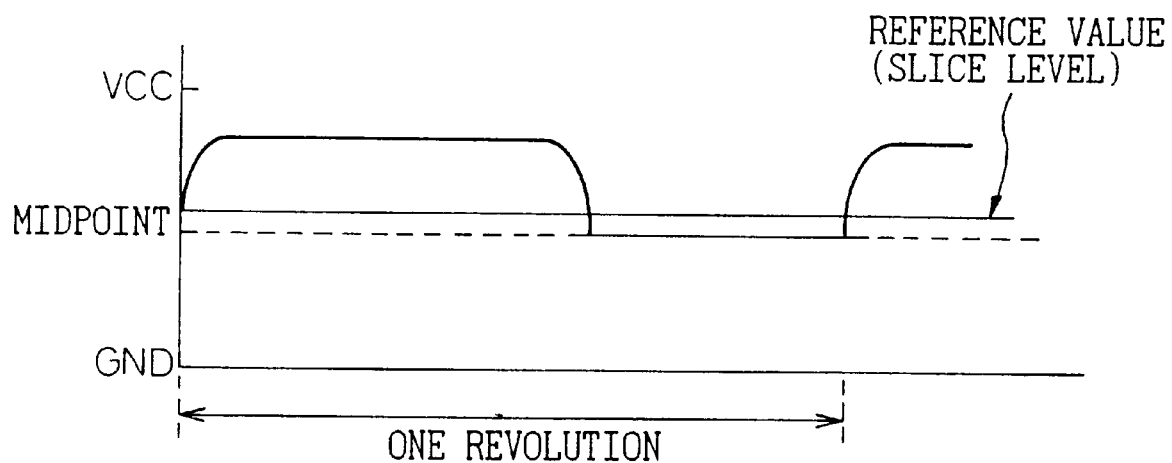
FIG. 21 shows an output waveform of the rotation sensor of FIG. 12 working with the magnet of FIG. 20.
Figure 22:
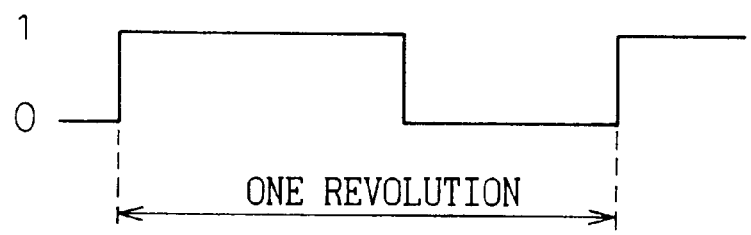
FIG. 22 shows an output waveform of the comparator of FIG. 12 working with the magnet of FIG. 20.

FIG. 20 shows still another example of the magnet 101. The magnet 101 of this example has a C-shape with only N poles. The output of the sensor 54 rises to VCC in response to the N poles and falls to a midpoint between VCC and GND in response to no poles, as shown in FIG. 21. The reference value used by the comparator 120 is set to be slightly higher than the midpoint, so that the comparator 120 provides an output of FIG. 22 with a pulse per a revolution of the magnet 101.

In FIG. 20, the N poles occupy ¾ of the circumference of the magnet 101, and therefore, the width of the pulse per revolution is 200 ms×¾=150 ms. The MPU 83 determines that the motor 104 is rotating if it detects a pulse width of 120 ms or longer in 200 ms in the output of the comparator 120, and that the motor 104 is not rotating if the pulse width is shorter than 120 ms in 200 ms.

Although the adapter 50 of the above embodiments receives the IC card 56, it may receive a memory card.

Figure 23:
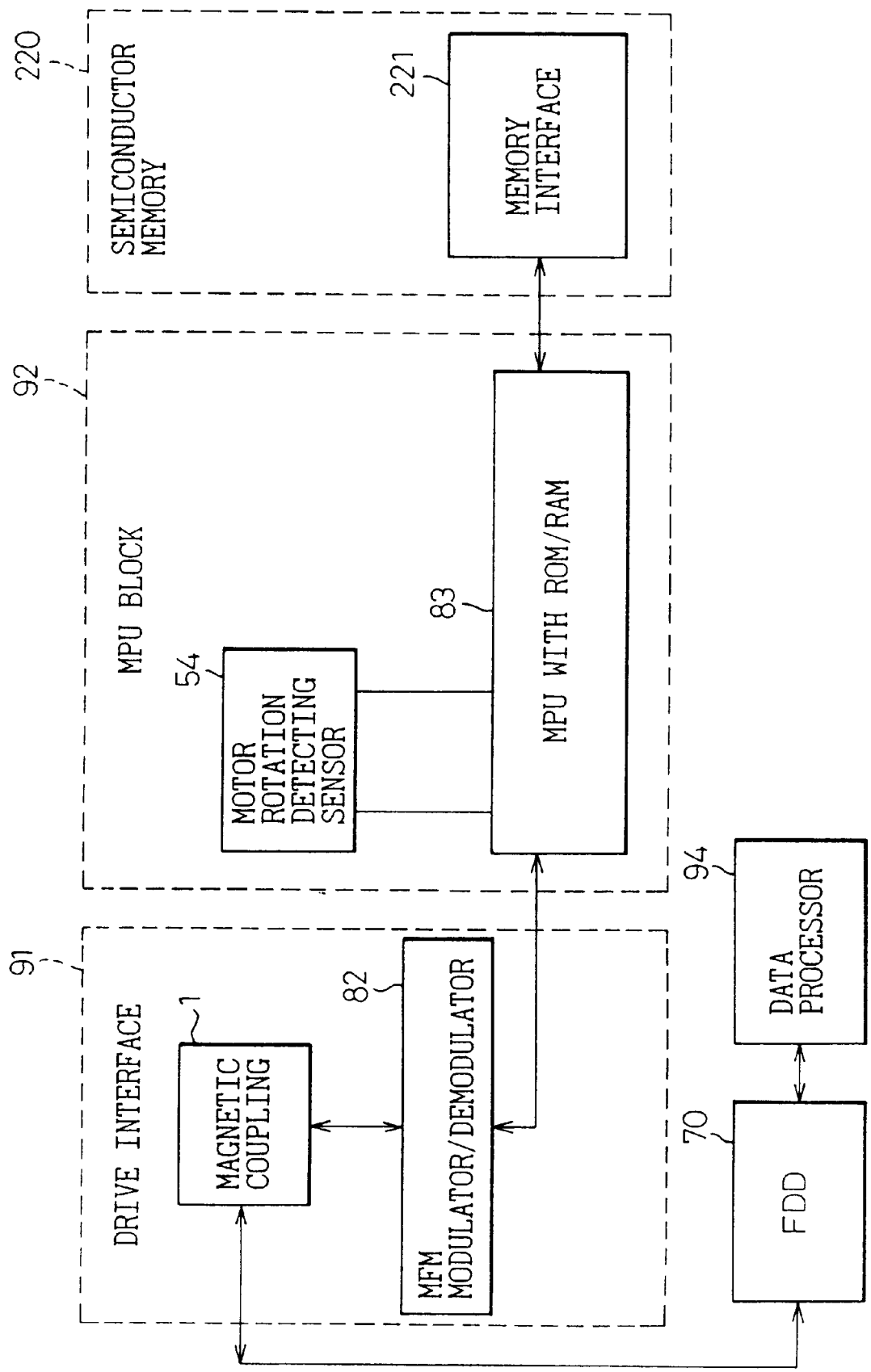
FIG. 23 shows an electric arrangement of a disk-cartridge-type adapter according to still another embodiment of the present invention.

FIG. 23 shows a disk-cartridge-type adapter according to still another embodiment of the present invention. The same parts as those of the adapter of FIG. 9 are represented with like reference marks and are not explained again. The adapter incorporates a semiconductor memory 220 instead of the IC card 93. The memory 220 has a memory interface 221.

If the output of a motor rotation sensor 54 indicates that a motor of an FDD in which the adapter is set is rotating, an MPU 83 supplies power from a power source to a drive interface 91 for the FDD, an MPU block 92, and the memory 220. If it is detected that the motor of the FDD is not running, the supply of power to the drive interface 91 is stopped, and power is supplied only to the MPU block 92 and memory 220.

The memory 221 may be incorporated in the MPU block 92.

In the above embodiments, the adapters have each the same shape as the FPD cartridge and the disk cartridge drives are each the floppy disk drive (FDD). The present invention is not limited to them. The adapters of the present invention may have the shape of any disk cartridge and are applicable to any disk cartridge drive.

As explained above, the adapters of the present invention are capable of detecting the rotation of a motor of a disk cartridge drive without a physical signal line between the adapters and the disk cartridge drive, and are capable of stopping the supply of power to unused parts in the adapters if the motor of the disk cartridge drive is not rotating, thereby reducing the consumption of batteries of the adapters.

The adapters detect the rotation of the motor of the disk cartridge drive by using a magnet that is usually installed in the disk cartridge drive, to thereby minimize labor and cost in achieving the present invention.

What is claimed is:

1. An adapter shaped to be inserted into a slot of a disk cartridge drive that is designed to receive a disk cartridge containing a recording medium, comprising:

a drive interface for establishing communication, through the disk cartridge drive, with a data processing device connected to the disk cartridge drive;

a processor for controlling data transfer between the adapter and the data processing device through the drive interface;

a power source for supplying power to the drive interface and processor; and a sensor for detecting a change in a magnetic field produced by the rotation of a magnet linked to a motor of the disk cartridge drive when the adapter is in the disk cartridge drive, the processor supplying power from the power source to the drive interface upon detecting the rotation of the magnet according to the output of the sensor.

2. The adapter of claim 1, wherein the processor stops the supply of power to the drive interface upon detecting the stoppage of the rotation of the magnet according to the output of the sensor.

3. The adapter of claim 2, further comprising:

an IC card slot for receiving an IC card that stores various kinds of information; and a card interface for establishing communication between the processor and the IC card, the processor supplying power from the power source to the drive interface and card interface while the processor is detecting that the magnet is rotating according to the output of the sensor and, upon detecting the stoppage of the rotation of the magnet, continuing the supply of power to the card interface and stopping the supply of power to the drive interface.

4. The adapter of claim 2, further comprising:

a semiconductor memory for storing various kinds of information; and a memory interface for establishing communication between the processor and the semiconductor memory, the processor supplying power from the power source to the drive interface and memory interface while the processor is detecting that the magnet is rotating according to the output of the sensor, and upon detecting the stoppage of the rotation of the magnet, continuing the supply of power to the memory interface and stopping the supply of power to the drive interface.

* * * * *

UNITED STATES PATENT AND TRADEMARK OFFICE
CERTIFICATE OF CORRECTION

PATENT NO. : 6,047,341
DATED : April 4, 2000
INVENTOR(S) : Niwata et al.

Page 1 of 1

It is certified that error appears in the above-identified patent and that said Letters Patent is hereby corrected as shown below:

Please add the priority data, as follows:
Japanese Application No. 9-289997 filed Oct. 22, 1997

Signed and Sealed this

Twenty-eighth Day of August, 2001

*Attest:*

*Attesting Officer*

NICHOLAS P. GODICI
*Acting Director of the United States Patent and Trademark Office*